United States Patent [19]
Heineman

[11] Patent Number: 5,503,585
[45] Date of Patent: Apr. 2, 1996

[54] TURKEY CALL DEVICE

[75] Inventor: Ralph N. Heineman, Chaffee, N.Y.

[73] Assignee: Donna L. Heineman, Chaffee, N.Y.

[21] Appl. No.: 450,658

[22] Filed: May 30, 1995

[51] Int. Cl.⁶ .................................................. A63H 5/00
[52] U.S. Cl. .................................................. 446/397; 43/2
[58] Field of Search .................................. 446/397, 404, 446/405, 406, 213, 214, 188, 189; 43/2

[56] References Cited

U.S. PATENT DOCUMENTS

| | | |
|---|---|---|
| 1,449,756 | 3/1923 | Jackson ........................ 446/397 |
| 2,511,403 | 6/1950 | Fleener . | 
| 2,573,856 | 11/1951 | Malone, Jr. .................... 446/406 |
| 4,041,639 | 8/1977 | Funk ............................. 446/397 |
| 4,310,986 | 1/1982 | Jacobs .......................... 446/397 |
| 4,343,108 | 8/1982 | Lee . | 
| 4,606,733 | 8/1986 | Willis ........................... 446/397 |
| 4,836,822 | 6/1989 | Finley et al. . | 
| 4,850,928 | 7/1989 | Stewart . | 
| 4,955,845 | 9/1990 | Piper ............................ 446/397 |
| 4,988,325 | 1/1991 | Alderson et al. ............... 446/397 |
| 5,158,494 | 10/1992 | Ball .......................... 446/397 X |
| 5,178,575 | 1/1993 | Koch ............................ 446/397 |

*Primary Examiner*—Mickey Yu
*Assistant Examiner*—D Neal Muir
*Attorney, Agent, or Firm*—Crossetta & Associates

[57] ABSTRACT

The present invention is an improved box game call device comprising a multiple call registering scraper block, having an edge engaging striker affixed within a sound enhancement chamber. The scraper block is mounted within an elongate sound resonance box and is arranged for the repeatable generation of multiple distinct game attracting sounds.

20 Claims, 4 Drawing Sheets 5,503,585

TURKEY CALL DEVICE

The present invention relates to a device for simulating sounds made by wild game, particularly those of a wild turkey. The invention features an embodiment which is convenient for single handed operation and provides consistent registered repetition of various desirable sounds, with minimum operator skill.

BACKGROUND OF THE INVENTION

In the sport of hunting wild game, it is a time honored tradition to utilize calling devices to lure or otherwise attract the game. Particularly in the case of the elusive wild turkey, which is generally known to be a shy and wary game, the use of calling devices has been widely practiced but only with mixed results.

In wild turkey hunting, it is well known that the game is particularly wary of hunter visibility, movement and sounds. It is difficult to come within shooting range of a wild turkey and great care is taken by the hunter to assure that he remains unseen by the quarry and that no sound or movement is made that might cause the quarry to precipitously flee into hiding. To assure such, hunters generally position themselves in likely habitat of the wild turkey and than use a calling device or the like to attract the turkey into shooting view.

The prior art is replete with turkey call devices, most of which commonly comprise a friction plate and striker in an arrangement which relies heavily upon delicate and skillful manipulation by the operator to produce various sounds which might attract a wild turkey. It is a fair assessment that such calls are difficult to operate effectively and indeed most are found more often on the sportsman's trophy shelf than among the equipment brought to a hunt.

One common turkey call device involves a support assembly which is generally held in one hand and a striker which is held in the other hand for manipulation against the support assembly. The operator scrapes the striker along a friction plate of the support assembly in a particular skillful fashion so as to produce clucking or the like sounds which may prove attractive to a turkey. Such devices generally require significant skill and dexterity to operate in an effective manner and are generally known to require many hours of practice and experience before an appropriate sound suitable for attracting turkeys can be generated. In addition the two handed operation of the device is a disadvantage in the field in that it requires a careful handling of luring device and shooting equipment in order to enjoy the fruits of what may have been attracted.

U.S. Pat. No. 4,606,733 discloses a game calling device wherein a striker is arranged in a resonant box having an acoustical chamber at the bottom with resonant openings. The striker is mounted to a rod which extends through the ends of the box and manipulation of the rod through the box enables movement of the striker longitudinally along a friction plate comprising the top of the acoustical chamber. Such device is designed for single handed use wherein the operator can hold the box in his palm and manipulate the rod with a finger to initiate a scraping sound. There are many drawbacks to such device, particularly that the type of sound generated cannot be conveniently modified by the operator for changing conditions and/or turkey interest, a particular sound cannot be conveniently registered for repetition, and the extending rod is vulnerable to inadvertent operation particularly when moving from a calling to a shooting position and thus the hunter is vulnerable to precipitous flushing of wary game.

U.S. Pat. No. 4,955,845 discloses a game calling device wherein a round ended striker is perpendicularly affixed to the base of a generally rectilinear handle block which is arranged for longitudinal displacement within an elongate rectangular box. The interior surface of the bottom of the box comprises a friction plate. The handle block is held against an end of the box in the rest position by a U-shaped spring, which also urges the handle back to rest after longitudinal displacement by the manipulation of the operator.

The box is configured at the rest end to initially hold the handle block generally parallel, and the striker generally perpendicular, to the friction plate. The round end of the striker is maintained in general engagement with the plate. The handle block is configured with a rounded shoulder at the rest end for engagement of a thumb or fingers of the operator. In the operation of the device, the rounded shoulder of the handle block is pushed downwardly into the rectangular box and the handle block is longitudinally displaced within the box. The rounded striker is thus pivoted from a generally perpendicular engagement with the friction plate to an acute angular engagement and the longitudinal displacement of the acute angled striker engaging the friction plate causes a sound to be generated.

Such device is said to be capable of efficient one-handed operation but has shown to be inconvenient for such purpose in the field. The downward tilting movement of the handle block has proved awkward to achieve the delicate single hand manipulation required to generate a suitable sound, and most frequently the operator finds himself holding the box in one hand and delicately manipulating the handle block with the other. The design of the action of the handle block does not provide for durability in the field in that the handle block is not securely positioned within the rectangular box and thus the handle block tends to fall from the box during use and can require clumsy and undesired rearrangement and realignment during critical moments of use during the hunt. Further, the delicate movement required to operate the device demands significant practice and skill to attain consistency, and the consistency which may be so attained appears non-registerable. By non-registerable is meant that the device itself provides no means to predict a particular attracting sound which may be generated by different samples of the same device, such being wholly dependent upon the feel and skill of the operator for the particular device in hand. Thus, there is a wide variance in the sound made by different operators using the same device in a similar manner, and the effectiveness of the device is more strongly dependent upon the skills honed by the operator than the device itself.

It is an object of the present invention to provide a game calling device which is convenient for single handed operation and durable for use in the field.

It is a further object of the invention to provide a game calling device which is easy to master and is capable of generating different calls for use in different circumstances.

It is a still further object of the invention to provide a game calling device which comprises convenient means for registering various different calls amongst different units.

These and other objects of the invention will be apparent from the following description of the invention.

SUMMARY OF THE INVENTION

The present invention is an improved box game call device comprising a generally rectilinear scraper block, fitted with an edge engaging striker, mounted within a sound enhancement chamber of the block, which is arranged for controlled force longitudinal displacement within an elongate rectangular sound box.

The elongate rectangular sound box comprises a generally flat rectangular base wall and has opposing, generally flat, side and end walls mounted generally perpendicular thereto so as to form a rectangular trough having an open top. The opposing side walls comprise longitudinally arranged opposing slots, which are sized to slidable accept scraper block mounting means.

The interior surface of the base wall comprises a friction surface, which may be formed of any suitable material. In one embodiment, the base wall itself is formed from the desired friction material. In a preferred embodiment, the base wall is constructed from a structural material which is slotted along a length of its interior surface for mounting of a suitable friction plate. In a most preferred embodiment the bottom and side walls of the box are constructed from a hard wood for its sound resonance qualities and the interior base surface is slotted to mount a friction plate comprising aluminum, slate, glass, graphite, plastic such as an acrylic plastic, or the like material.

The scraper block generally comprises a solid rectilinear structure of a convenient material sized to slidably fit within the trough defined by the opposing side walls and be slidable within the trough, along about the length of the trough. The bottom surface of the block is generally rounded at a front end for convenient pivoting during cleaning, comprises a sound enhancement chamber rearward of the front end which extends through the bottom surface and into the block, and a striker. Preferably, the block is formed from a hard wood material.

The side surfaces of the generally rectilinear scraper block are generally parallel and the top surface comprises a plurality of spaced finger register slots.

The placement of the sound enhancement chamber is toward the back end of the block, opens into the bottom surface of the block and the opening is generally positioned along about the longitudinal centerline of the bottom surface. In a preferred embodiment, the sound enhancement chamber is a generally cylindrical space extending into the block, generally perpendicular to the base thereof. In a preferred embodiment, the sound enhancement chamber is at a slight angle up to about 7° to the perpendicular.

The striker, extends outwardly from the bottom of the scraper block, and can be made of the same or different material as the scraper block. It comprises an elongate structure which extends outwardly from the interior of the sound enhancement chamber, along about the longitudinal axis thereof, beyond the bottom surface of the scraper block and generally perpendicular thereto. In a preferred embodiment, the striker is at a slight angle up to about 7° to the perpendicular. The striker is generally columnar and is sized to extend through the sound enhancement chamber without engaging the walls thereof. The columnar striker can be of any suitable configuration including having one or more flattened and/or beveled sides, however a cylindrical striker is generally preferred.

In a preferred arrangement the sound enhancement chamber is cylindrically configured and the striker comprises a cylindrical rod mounted to the scraper block at a closed end of the chamber and extending along about the centerline of the chamber external to the block. In a further preferred embodiment the scraper block is formed of hard wood, the sound enhancement chamber is a cylindrical hole drilled through the bottom surface at about an end of the block, and the striker is an acrylic plastic rod mounted in a hole in the block along about the centerline of the chamber.

The scraper block is longitudinally arranged in the rectangular trough so that striker engages the friction surface of the base of the box. The extension of the striker from about the back end of the bottom of the block, thus maintains the back end of the block spaced from the interior friction surface of the base of the box. The scraper block mounting means extend through the slots in the opposing sides of the box, engage the scraper block at about the front end of the block and are arranged to maintain the front end of the scraper block spaced from the interior friction surface of the base of the box through the longitudinal displacement thereof. In a preferred embodiment the mounting means are arranged to maintain the bottom surface of the scraper block generally parallel to or at a slight angle, less than about 20° and preferably about 8°, to the interior friction surface of the base of the box.

The mounting means can be any suitable means which can extend through the slots, mount to the scraper block and slidably engage the slot to enable spaced longitudinal movement of the scraper block. In one embodiment, the mounting means comprises a rod which inserts through the front area of the scraper block and extends into the opposing slots. In a preferred embodiment, the mounting means comprises screw means mounted through the slots into the front portion of a wooden scraper block.

Mounting of the scraper block in such manner allows the striker of the scraper box to rest on the friction surface of its own weight. In a preferred embodiment of the invention, a return coil spring means is mounted to the interior surface of the base of the box at one end and toward a rear portion of the scraper block at the other end in an arrangement which tends to urge the striker against the friction surface. In a further preferred embodiment the bottom surface of the scraper block is slotted and the spring is mounted in alignment with said slot.

The end of the columnar striker, which extends from the bottom of the scraper block, is beveled to provide a rear most scraping edge for engaging the friction surface. The trailing longitudinal surface forms the edge. In a preferred embodiment a rearward edge of a columnar striker engages the friction surface and the scraping edge comprises a generally vertical or slightly angled surface which is lateral to the direction of movement of the scraping block from the rest position.

In a most preferred embodiment the columnar striker is cylindrical, the end is beveled and forms a rounded edge wherein only a small sector engages the friction surface.

The top surface of the generally rectilinear scraper block comprises a plurality of spaced slots. In a preferred embodiment two or three spaced slots are laterally formed in the top of the block and are sized for convenient engagement with a finger tip of the operator. In a most preferred embodiment the slots are of varying configuration for convenient touch identification by the operator.

In preferred use, the operator holds the device with the back end of the box cradled against the base of the palm of the hand, with a finger extended to engage a slot of the scraper block. The front portion of the palm is generally cupped around the rear top portion of the open trough of the box directing sound waves forward from the device. The device is operated by delicately pulling the scraper block toward the rear of the box with bending movement of the finger.

The placement of a finger tip in a particular slot effects the convenience of finger movement, which in turn affects the movement of the scraper block and the extent and quality of sound which is generated. Thus, if the index finger is extended to engage the most forward slot, the starting position of the finger lends itself to relatively unrestricted further bending and relatively unrestricted rearward movement of the scraper block within the trough. As the selection of slots engaged by the finger tip progresses rearward, the finger must be increasingly bent for initial engagement and the awkwardness of the finger position becomes more restrictive to the operator to further bending of the finger to move the scraper block rearward. In addition, the progressive rearward engagement of the finger tip in a slot moves the point at which pressure is placed upon the block toward the striker and increases the downward angle at which pressure is being placed.

Thus, as the operator moves the position of his finger in use of the device, from a forward to a rearward slot, the extent of longitudinal displacement of the scraper block becomes naturally restricted while the moment and the quantity of the force imposed at the edge of the striker, which engages the friction surface, changes. These changes provide distinct changes in sound which are conveniently registered to finger placement in defined slots.

The sound generated using a most forward slot generally is more delicate, of longer duration and is characterized as a soft pleading yelp or purring sound generally considered similar to a hen turkey attracting a tom turkey and generally preferred by the hunter for close-in game calling. The sound generated using a medium positioned slot is generally characterized as being a more excited yelp or aggressive purr, while the sound generated using a most rearward positioned slot is characterized as a clucking or cutting sound of an excited hen turkey generally preferred by the hunter for attracting tom turkeys from a distance.

DETAILED DESCRIPTION OF THE DRAWINGS

Figure 1:
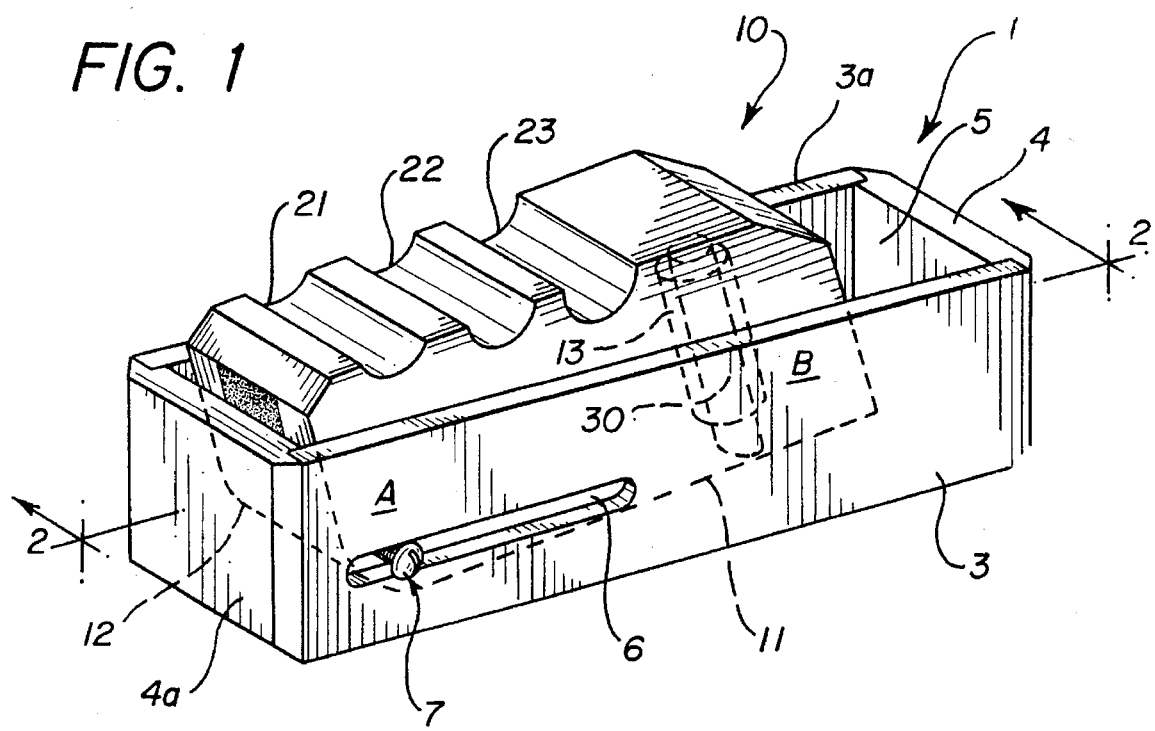
FIG. 1 is a perspective view of a turkey call device of the invention.
Figure 2:
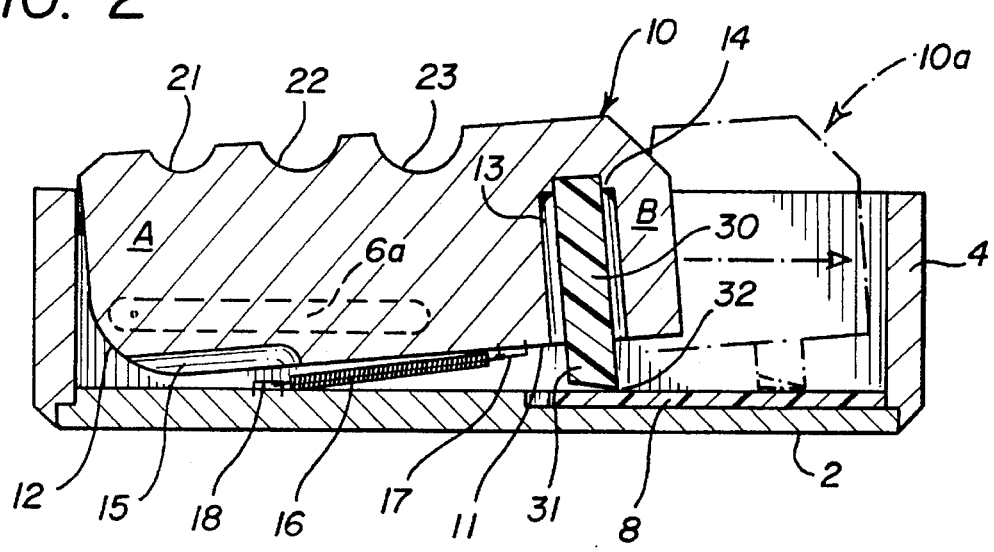
FIG. 2 is a sectional side elevational view of the turkey call device of FIG. 1 taken along about line 2—2 of FIG. 1.
Figure 3:
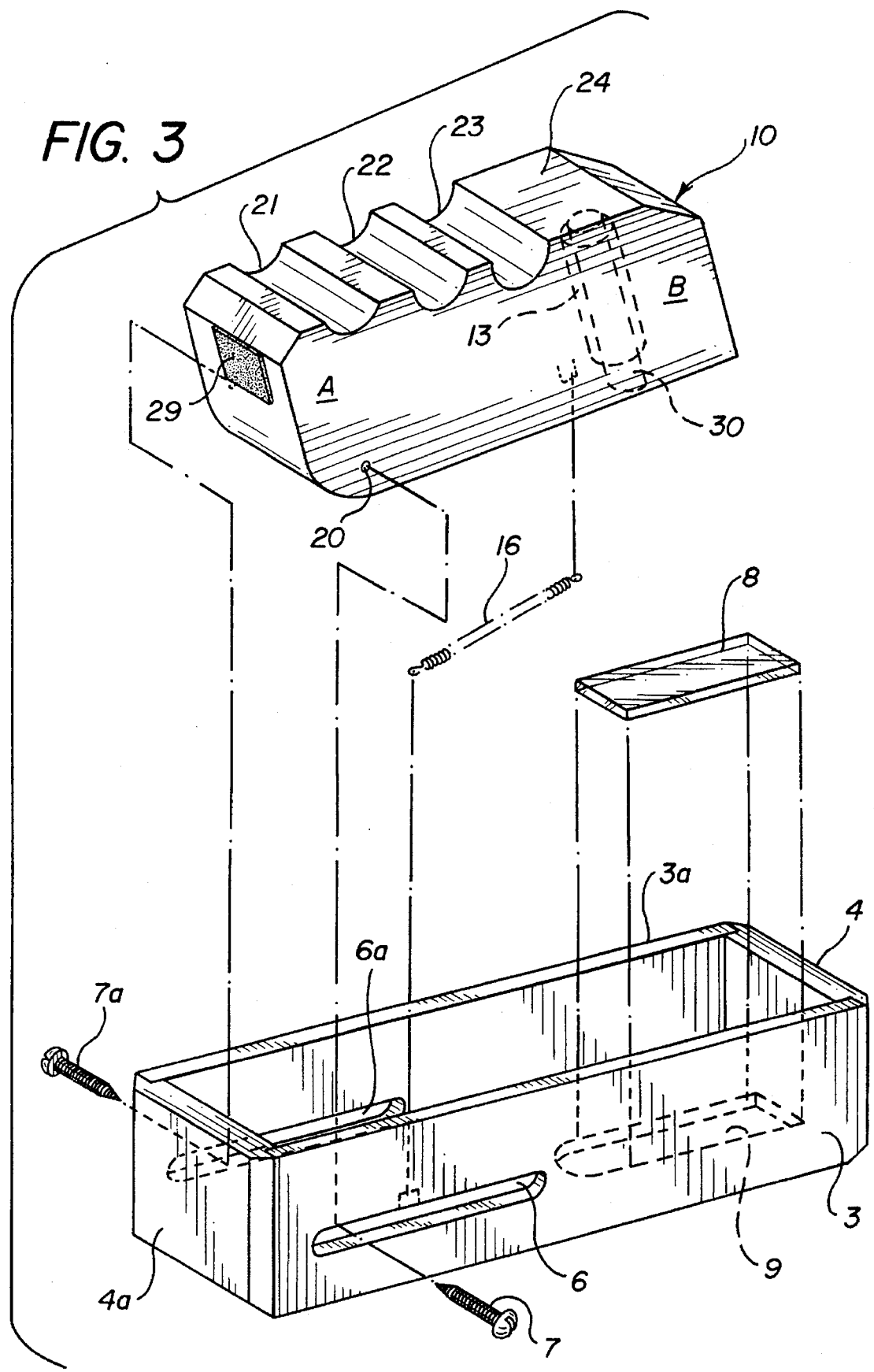
FIG. 3 is an exploded perspective view of the turkey call device of FIG. 1.
Figure 4:
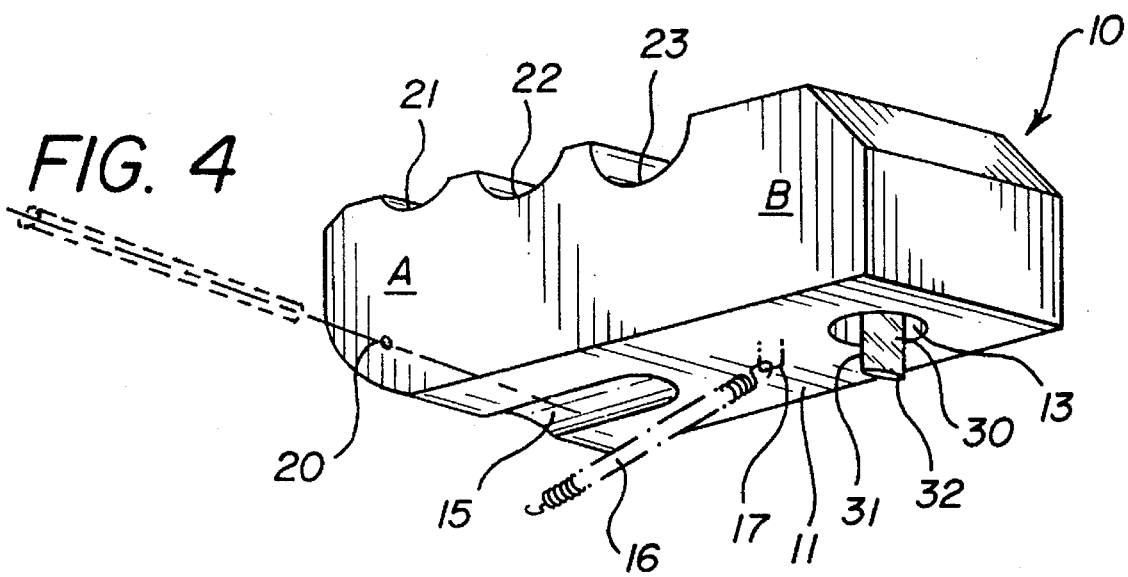
FIG. 4 is a bottom perspective view of a scraper block of FIG. 1.

Referring first to FIGS. 1–4, therein is illustrated a turkey call device comprising an elongate, wooden rectangular sound box 1 and wooden scraper block 10.

Sound box 1, comprises a generally flat rectangular base wall 2, opposing side walls 3 and 3a and opposing end walls 4 and 4a, mounted generally perpendicular thereto, so as to form a rectangular trough having an open top 5. Opposing side walls 3 and 3a, comprise longitudinally arranged opposing slots 6 and 6a, which are sized to slidable accept scraper block mounting screws 7 and 7a which are mountable to holes 20 and 20a (not shown) in forward portion "A" of scraper block 10 (illustrated in phantom rearward movement as 10a).

The interior surface 2a, of base wall 2, comprises a friction plate 8, which mounts in slot 9 in interior surface 2a of base wall 2. In the preferred embodiment of the figure, friction plate 8 is formed from an acrylic plastic and is held in slot 9 by glue means.

Bottom surface 11 of scraper block 10 is rounded 12, with pad 29, at forward portion A, and comprises sound enhancement chamber 13, ending in hole 14 at rearward portion "B", extending through bottom surface 11 and into block 10.

Striker 30 is rod shaped and is mounted in hole 14 at the end of sound enhancement chamber 13 in scraper block 10. Preferably, striker 30 is press fitted into hole 14. The scraper block is generally formed from a hard wood material.

Striker 30 is beveled at end 31, preferably to provide an edge 32 for engaging friction plate 8. Preferably, the bevel is less than about 30° from the perpendicular cross section of the striker and is arranged such that the engaging edge of the striker is toward the rear of the scraper block. It should be understood that the edge need not be sharpened, and can be rounded and/or flattened.

Generally, it is preferred that the striker be cylindrical, however any convenient shape appears operable with the invention. In a preferred embodiment a cylindrical striker, having a diameter from about 0.15 to about 0.4 inches, is mounted to the scraper block.

Bottom surface 11 of scraper block 10 comprises a slot 15 which is aligned to allow unrestrained passage of spring 16 from mounting staple 17 at rearward portion B of scraper block 10 to mounting staple 18 at a forward portion of interior surface 2a of base wall 2.

Register slots 21, 22 and 23 are in spaced lateral arrangement on upper surface 24 of scraper block 10, between about the position of striker 30 and the front end of scraper block 10. The slots are generally configured of differing depth, preferably being progressively deeper from the forward slot to the rear slot. Placement of register slots and their depth can be integral with finger tip, touch registration of reproducible sounds.

Figure 5:
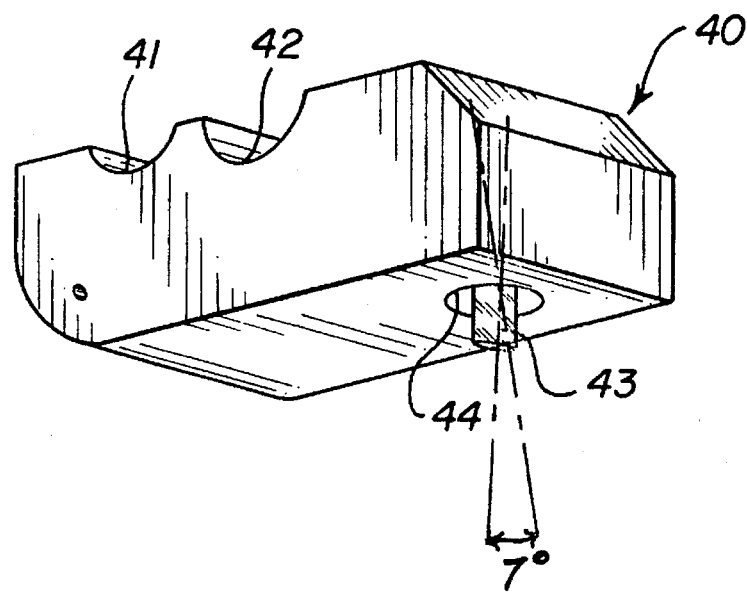
FIG. 5 is a bottom perspective view of another embodiment of the turkey call device of the invention.

FIG. 5 comprises a further embodiment of the scraper block of the invention. Therein scraper block 40 comprises two lateral slots 41 and 42 and striker 43 mounted to extend from sound enhancement chamber 44.

Figure 6:
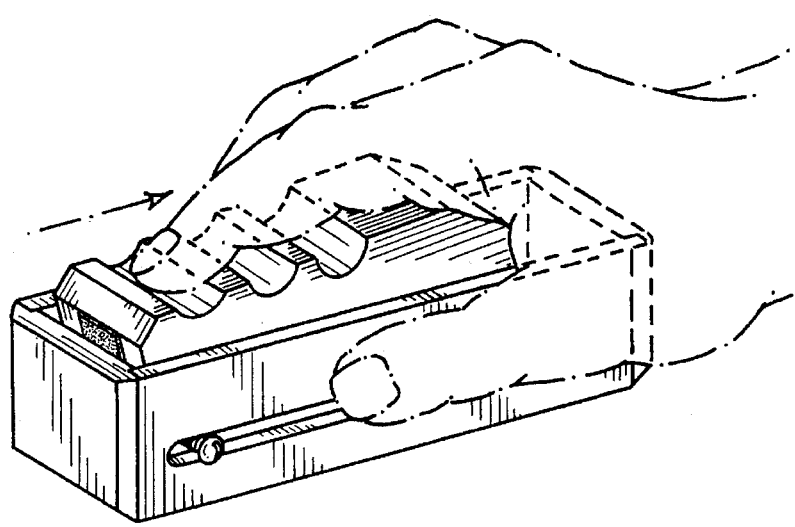
FIG. 6 is a perspective view showing hand and finger placement when a turkey call device of the invention is being manipulated to generate a soft pleading yelp or purring sound.
Figure 7:
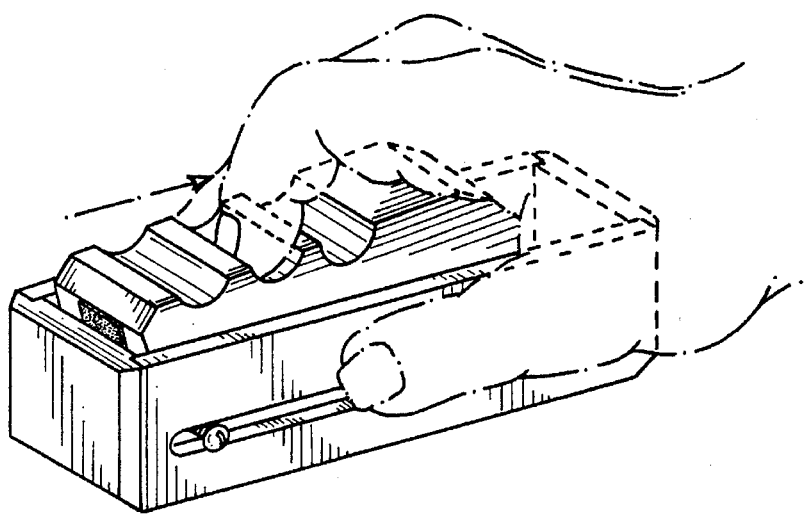
FIG. 7 is a perspective view showing hand and finger placement when a turkey call device of the invention is being manipulated to generate an excited yelp or an aggressive purr sound.
Figure 8:
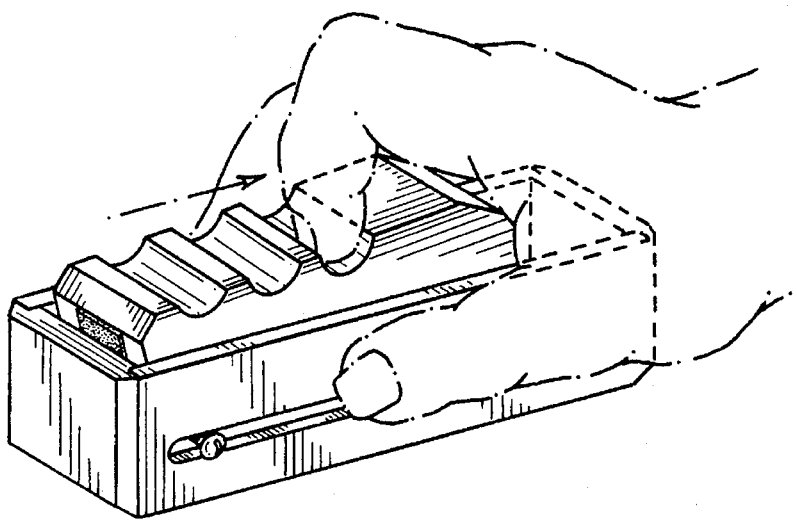
FIG. 8 is a perspective view showing hand and finger placement when a turkey call device of the invention is being manipulated to generate a clucking or cutting sound.

FIGS. 6–8 illustrate the various positions of a finger in operating the device to achieve consistent desirable sounds.

In FIG. 6, the tip of the index finger is extended to engage the forward most slot of the scraper block, the palm of the hand is cupped and the scraper block is delicately pulled toward the rear of the resonant box causing a light purr or yelp to be emitted being a slight chatter from the striker edge rubbing against the friction plate. The forward positioning of the finger tip, particularly in combination with the light finger tip grip occasioned by the configuration of the slot, makes it awkward to apply downward pressure during the process so that the striker tends to lightly engage the friction plate enabling a longer uninterrupted stroke and the emitting of a soft, delicate sound.

In FIG. 7, the index finger is bent a little, and the slot is configured to enable a firmer finger tip engagement during stroking of the scraper block. Such positioning tends to cause the operator to apply more downward force during stroking and tends to reduce the length of the stroke. The result is a firmer engagement of the striker with the friction plate creating a firmer, more distinct staccato sound which is said to be a more excited yelping or purring sound than generated in the forward slot.

In FIG. 8, the index finger is aggressively bent and the rearward most slot is configured to enable a very firm engagement of the tip of the index finger. The severely bent finger forces the striker strongly downwardly against the friction plate such that movement therealong is highly resistant and abrupt. The resulting sound which is emitted is an abrupt, sharp chatter which is said to be similar to a clucking or cutting sound that is made by a very excited hen turkey.

I claim:

1. An improved box game call device comprising:

a generally rectilinear scraper block, having opposing forward and rearward portions, said block comprising a hollow sound enhancement chamber having an interior end wall, an interior side wall, and an opening through a bottom surface of said rearward portion of said block, said chamber comprising a striker member which is spaced from said interior side wall of said chamber and extends outwardly from said interior end wall of said chamber, through said opening in said bottom surface of said block;

an elongate, generally rectangular sound box, having end walls defining forward and rearward ends, generally opposing parallel elongate sidewalls arranged between said end walls and a generally flat base wall in an arrangement which defines a longitudinally extending trough sized to accept said scraper block and enable longitudinal displacement of said scraper box therein;

wherein said base wall comprises a friction surface at an interior side thereof and said generally parallel side walls comprise a longitudinally extending slot arranged to accept a mounting means for engaging a forward portion of said scraper block and maintain said forward portion of said scraper block spaced from the base wall of said box during longitudinal displacement of said block in said trough, said mounting means extending through said slot and comprising a surface which is arranged to engage a longitudinal border of said slot; and said scraper block comprises means for registering finger placement on an upper surface of said scraper block.

2. The device of claim 1 comprising a coil spring, having a first end engaging a forward portion of said box and a second end engaging a bottom surface of said scraper block in an arrangement which urges said scraper block downwardly and toward a forward position in said trough.

3. The device of claim 1 comprising a columnar striker member.

4. The device of claim 3 wherein said columnar striker is beveled at an end to form an edge for engagement with said friction surface.

5. The device of claim 4 wherein said edge comprises a side arranged generally perpendicular to the bottom surface of said scraper block and a side arranged at an acute angle to said perpendicular.

6. The device of claim 3 wherein said striker member is a cylindrical rod.

7. The device of claim 1 wherein said chamber comprises a cylindrical hole formed through the bottom surface of said scraper block.

8. The device of claim 7 wherein said hole is arranged from about perpendicular to about 7° to said bottom surface of said scraper block.

9. The device of claim 3 wherein said striker member comprises a plastic rod.

10. The device of claim 1 wherein said means for registering is identifiable by finger touch of an operator.

11. The device of claim 10 wherein said means for registering comprises a variation in height along the upper surface of the scraper block.

12. The device of claim 11 wherein said means for registering comprise a plurality of slots.

13. The device of claim 12 comprising two slots.

14. The device of claim 2 wherein said scraper block comprises a slot on its bottom surface proximate said spring.

15. The device of claim 3 wherein said columnar striker engages said friction surface from about perpendicular to about 7° to said surface to generate a sound.

16. The device of claim 15 wherein said friction surface is selected from wood, aluminum, glass, graphite, slate and plastic.

17. The device of claim 16 wherein said friction surface is mounted to said base wall.

18. The device of claim 1 wherein said mounting means comprises a rod extending through said scraper block into a slot in said side wall.

19. The device of claim 1 wherein said mounting means comprises a screw mounted through a slot in said side wall to said scraper block.

20. A game calling device comprising:

a generally rectilinear scraper block, having opposing forward and rearward portions, said block comprising a hollow sound enhancement chamber having an interior end wall, an interior side wall, and an opening through a bottom surface of said rearward portion of said block, said chamber comprising a cylindrical striker which is spaced from said interior side wall of said chamber and extends outwardly from said interior end wall of said chamber, through said opening in said bottom surface of said block and comprises a beveled end;

an elongate, generally rectangular sound box, having end walls defining forward and rearward ends, generally opposing parallel elongate sidewalls arranged between said end walls and a generally flat base wall in an arrangement which defines a longitudinally extending trough sized to accept said scraper block and enable longitudinal displacement of said scraper block therein;

a coil spring, having a first end engaging a forward portion of said box and a second end engaging a bottom surface of said scraper block in an arrangement which urges said scraper block downwardly and toward a forward position in said trough;

wherein said base wall comprises a friction surface at an interior side thereof and said generally parallel side walls comprise opposing longitudinally extending slots arranged to accept a mounting means for engaging a forward portion of said scraper block and maintain said forward portion of said scraper block spaced from the base wall of said box during longitudinal displacement of said block in said trough; and said scraper block comprises spaced parallel slot means extending laterally across an upper surface thereof for registering finger placement on said upper surface.

* * * * *